Jan. 30, 1962    R. BIRMANN    3,018,623
EXPLOSION GAS TURBINES
Filed Nov. 4, 1960    4 Sheets-Sheet 1

INVENTOR.
RUDOLPH BIRMANN
BY
ATTORNEYS

INVENTOR.
RUDOLPH BIRMANN

# United States Patent Office 3,018,623
Patented Jan. 30, 1962

3,018,623
EXPLOSION GAS TURBINES
Rudolph Birmann, Highland Farm, Newtown, Pa.
Filed Nov. 4, 1960, Ser. No. 67,290
18 Claims. (Cl. 60—39.36)

This invention relates to improved explosion gas turbines in which the combustion occurs substantially at constant volume while the air-fuel ratio is low, approaching the stoichiometric air-fuel ratio.

It has long been recognized that combustion at constant volume (i.e. explosion) would be theoretically ideal, from the standpoints of the fuel economy and specific output, particularly in view of the fact that relatively low compression ratios can be employed. Numerous proposals have been made to utilize cycles involving constant volume combustion, but heretofore it has been considered that valving was essential leading to mechanical complications and low frequency of explosions providing intermittent feed of gases to the turbines so that all of the proposals have been completely impractical. For an explosion gas turbine to be successful, it is of paramount importance, not only that a practicable constant volume combustion system be evolved, but also that ways and means be found to make the efficiencies of the compressor and turbine remain high for widely varying operating conditions.

One objective of the invention is to actually realize to the fullest extent the advantages with regard to high thermal efficiency and high specific output which are theoretically attainable with gas turbines employing the constant volume combustion cycle.

Another objective is to maximize the thermal efficiency and the specific power output by making possible the use of low air-fuel ratios and the resulting high cycle peak temperatures by means of a simple but very effective cooling of all stationary and rotating turbine components.

Another objective is to solve the problem of bringing about constant volume combustion in a novel fashion which eliminates the need for valves of any kind that hitherto have been necessary to effect the required opening and closing of the constant volume combustor.

A further objective is to integrate compressor, combustor and turbine in such a manner and make provisions in the design of the compressor and turbine blading that the rapid periodic fluctuations of pressures, flow rates and temperatures, which are inseparably associated with constant volume combustion, have little or no detrimental effect on the compressor and turbine performances.

Still another objective is to achieve a low specific fuel consumption under conditions of part load operations by providing for the combustion to occur with a constant air-fuel ratio at all loads and with the same maximum pressures and temperatures.

The attainment of the foregoing objectives in accordance with the present invention, will now be described by reference to the accompanying drawings in which.

Figures 1, 2, 9:
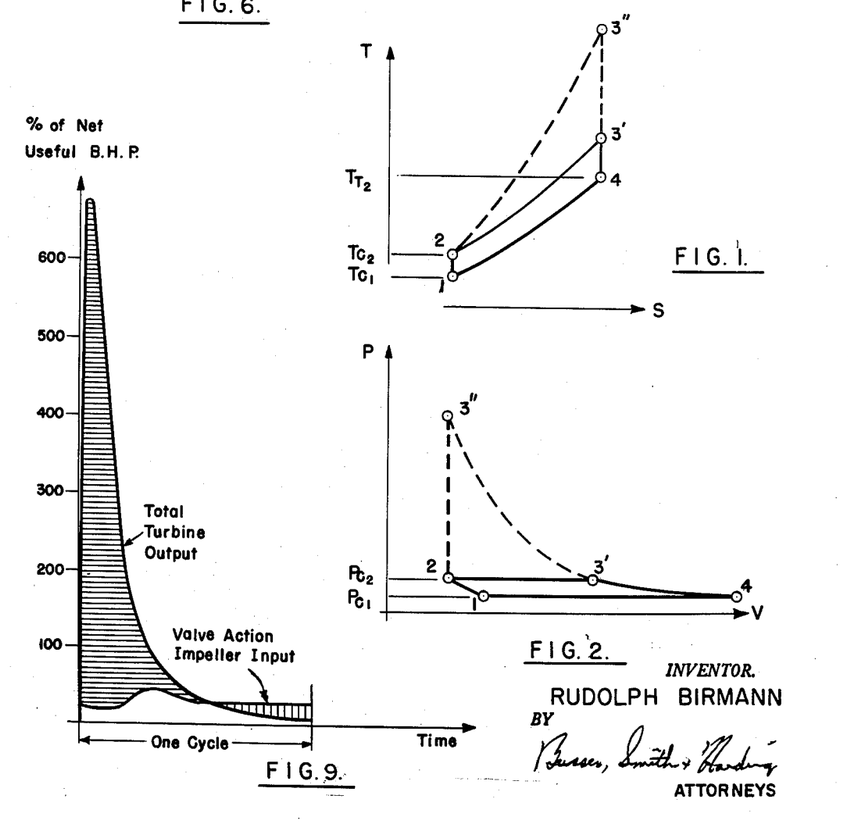
FIGURE 1 is a temperature-entropy diagram and FIGURE 2 is a pressure-volume diagram, both explanatory of matters pertaining to the invention.
FIGURE 9 is a graph comprising curves of the momentary horsepower developed by the turbine and absorbed by the impeller plotted as functions of time.

For the proper understanding of the invention, it will be well to review first both the constant volume and the constant pressure cycles as they appear in a temperature-entropy and in a pressure-volume diagram. These two diagrams are shown by FIGURES 1 and 2, in which the same state points in both diagrams are labeled by the same numbers, 1, 2, 3 . . . etc.

Air is compressed (for the purpose of the description adiabatic compression and expansion being assumed) from state point 1 (pressure $P_{c_1}$, temperature $T_{c_1}$) to state point 2, where the pressure and temperature are $P_{c_2}$ and $T_{c_2}$ respectively. The compressed air is then heated by the combustion of fuel, either under conditions of constant pressure (full lines) to state point 3' or under conditions of constant volume (dash lines) to state point 3''. This heating is followed by adiabatic expansion to state point 4, where the pressure is again the initial pressure $P_{c_1}$, but the temperature is $T_{T_2}$.

Since the areas 1, 2, 3', 4 and 1, 2, 3'', 4 measure the amount of fuel heat converted into mechanical work, it can be seen that the output achieved by means of the constant volume combustion process is much greater than that obtainable with the constant pressure process. Furthermore, it must be remembered that the amount of heat required to raise the temperature of the air by any desired amount $\Delta T$ degrees is $c_p \cdot \Delta T$ if the heating takes place under conditions of constant pressure and $c_v \cdot \Delta T$ for heating at constant volume. Since $c_p/c_v$ (the ratio of the specific heats of air at constant pressure and constant volume) is 1.4, it follows that compared with constant pressure combustion, any desired temperature rise can be achieved by the use of 40% less fuel if the burning of this fuel is made to occur under conditions of constant volume.

In view of the foregoing, the much higher thermal efficiencies of the constant volume combustion cycle as contrasted with the constant pressure combustion cycle, as shown by the following tabulation of ideal efficiencies, are due to its greater work output despite requiring relatively less heat input.

| Pressure Ratio | Thermal Efficiency of Cycle, Percent | |
| --- | --- | --- |
| | Constant Volume Combustion | Constant Pressure Combustion |
| 1.0 | 23 | 0 |
| 1.5 | 29 | 9 |
| 2.0 | 34 | 16 |
| 3.0 | 39 | 24 |
| 5.0 | 43 | 32 |

After the above review of some of the thermodynamic fundamentals applying to the invention, the following detailed description can now be presented.

Figures 3, 4:
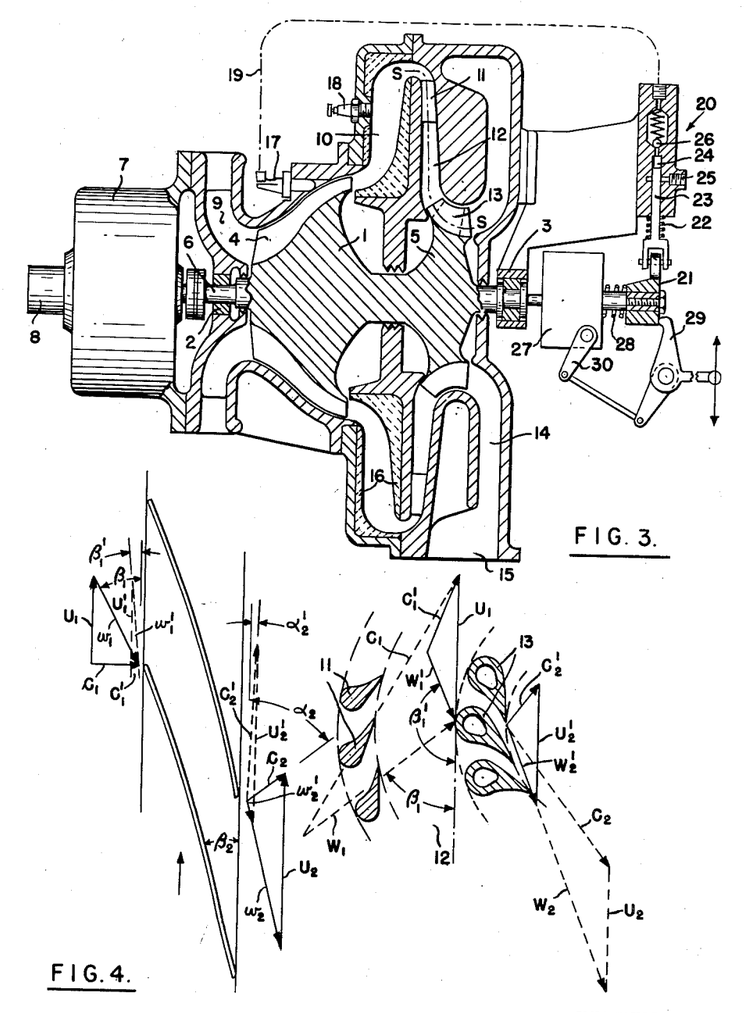
FIGURE 3 is a longitudinal section through a single stage explosion gas turbine designed in accordance with the invention.
FIGURE 4 is a diagram illustrating the blading of both the impeller and the turbine of FIGURE 3 in developed form.
Figure 5:
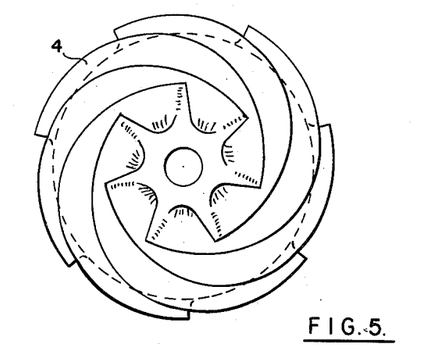
FIGURE 5 is an end view and FIGURE 6 is a side elevation of the valve action impeller of FIGURE 3.
Figure 6:
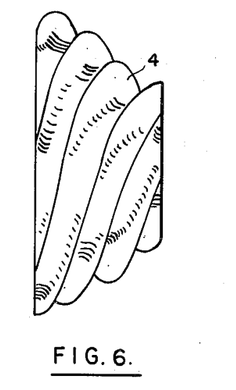
Figure 7:
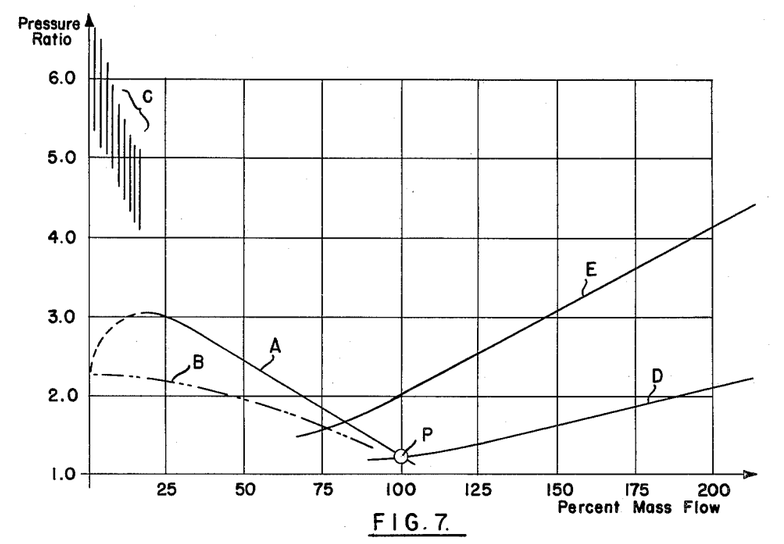
FIGURE 7 is a graph showing curves of pressure ratio vs. mass flow for both the impeller and the turbine of FIGURE 3.
Figure 8:
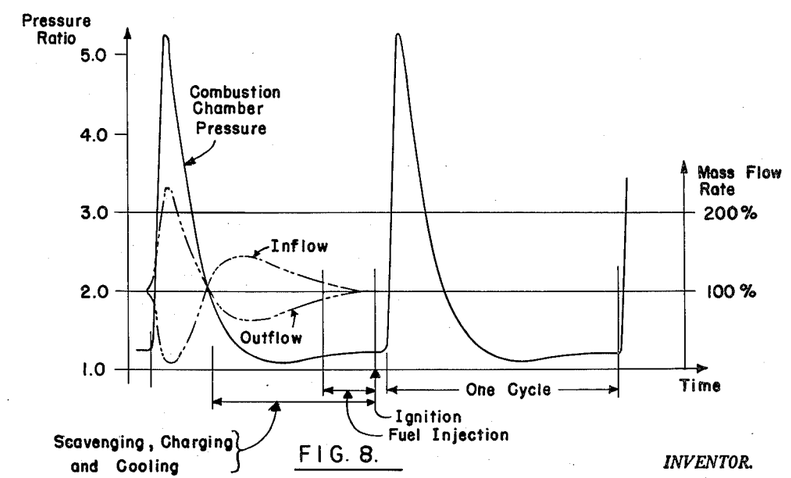
FIGURE 8 is a graph showing a curve of combustion chamber pressures and curves of mass flow rates through the impeller and the turbine of FIGURE 3, all plotted against time.
Figure 10:
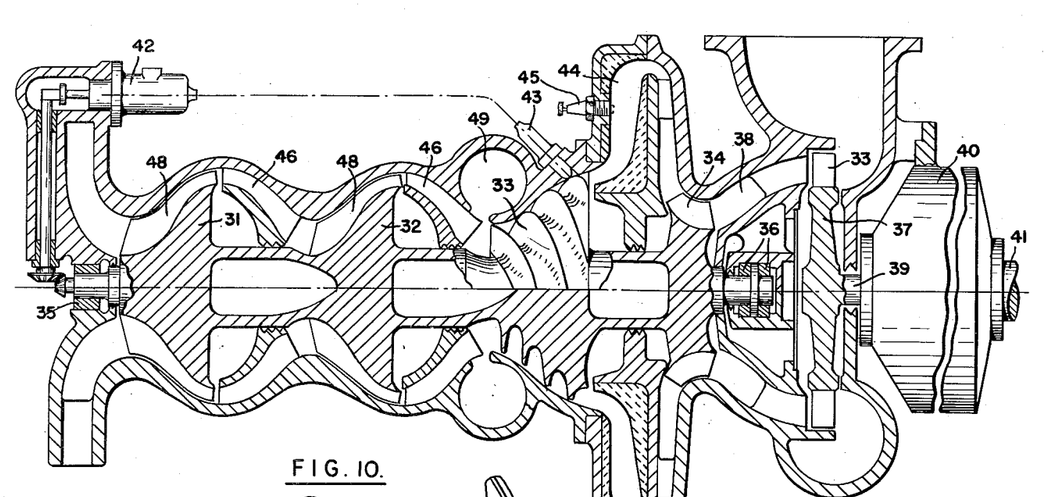
FIGURE 10 is a longitudinal section through a multistage explosion gas turbine.
Figure 11:
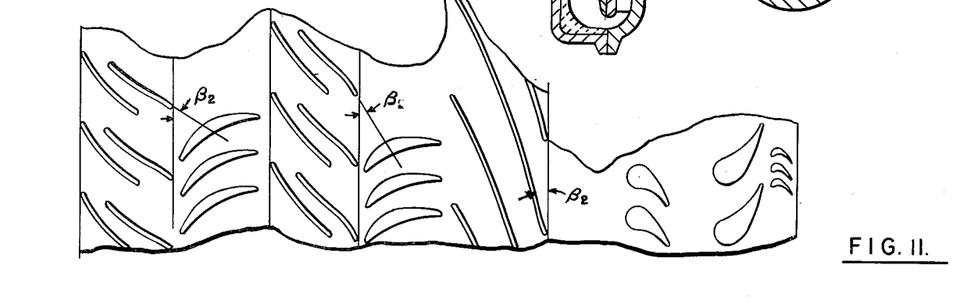
FIGURE 11 is a developed projection on a cylinder of the compressor and turbine blading of FIGURE 10.

FIGURE 3, showing a longitudinal section through a single stage unit (that operates with almost no compression), FIGURES 4, 5 and 6, illustrating the novel impeller and turbine blading, and FIGURES 7, 8 and 9 showing curves of operating characteristics will first be discussed for the purpose of explaining the basic features of the invention in such a way that the functioning of its preferred embodiment, namely that in a high pressure ratio, multi-stage unit such as shown by FIGURES 10 and 11 is more easily clarified.

Referring to FIGURE 3, the high speed rotor 1 is journalled in bearings 2 and 3 and consists (in addition to the shaft portions) of air impeller 4 and turbine wheel 5. The net power output is delivered through shaft end 6 to a conventional (planetary) reduction gear 7, by means of which the high rotor speed is reduced to whatever lower speed of the output shaft 8 is desired. Impeller 4 draws in air in axial direction through the radially inwardly extending approach passage 9, and discharges this air also axially, directly into the annular combustion chamber 10, which is axially quite narrow but extends radially over a considerable distance to a diameter approximately double that of the outside diameter of the impeller, so that it can function also as a vaneless diffuser. At the outer periphery of this combination vaneless diffuser and combustion chamber, the flow is discharged into the turbine nozzles 11. In these nozzles the flow is partially expanded and directed tangentially into the radially inwardly extending accelerating passage 12, in which further expansion and acceleration occurs before the flow spirals into the rotating passages 13 of turbine wheel 5, wherein the final expansion takes place. The discharge from the turbine blades is received by the radially outwardly extending vaneless exhaust diffuser 14, which converts the residual kinetic energy of the flow into a pressure rise and conveys the gases to the flanged turbine discharge opening 15.

The interior surfaces of the combustion chamber are protected by ceramic liners 16, which also serve as insulation to prevent substantial heat losses to the surroundings.

Fuel at high pressure is injected into the combustion chamber intermittently in rapid, very short periods through atomizing spray nozzles (injectors) 17, which are so arranged around the periphery of the impeller 4, that the fuel mist is blown into the rotating impeller discharge passages and, by the airflow therethrough, carried into the combustion chamber. Complete evaporation of the fuel particles and their thorough mixing with the air into an explosive mixture is thus assured.

As soon as enough time has elapsed (following the beginning of the fuel injection) for the entire combustion chamber to be filled with an explosive air fuel mixture, ignition thereof is brought about by several spark plugs 18 located at optimum points for initiating explosion, considering the particular construction and operation characteristics involved. The resulting combustion is instantaneous (explosion) because all the prerequisites for such rapid combustion to occur are met — the air fuel ratio is within the proper limits, the fuel has had sufficient time to completely evaporate and is intimately mixed with the air, and ideal conditions exist of the necessary micro and macro turbulence. The micro turbulence is chiefly due to the trailing vortices coming off the impeller blades, and the macro turbulence is in the form of the rotational nature of the free vortex flow that prevails in the combination combustion chamber and vaneless diffuser.

The fuel injectors 17 are supplied with high pressure fuel through a common conduit 19 by a single injection pump 20. The actions of cam 21 and spring 22 cause the pump plunger 23 to reciprocate in the cylinder bore 24. When the inlet port 25 is uncovered by the plunger, fuel enters the cylinder bore to be forced, during the upstroke, through check valve 26 to the injectors 17.

The duration of the injection period is determined by the r.p.m. and the contour of the single lobe cam 21. The frequency of the injections is that of the r.p.m. of this cam, which is driven from the rotor through the continuously variable reduction gearing 27 of known type.

The reduction ratio of gearing 27 is varied by lever 28. The reduce load the frequency of fuel injection is decreased by increasing the reduction gear ratio, duration of fuel injection being maintained constant, at constant r.p.m., by bringing into action a correspondingly modified cam contour having an active pumping lobe of steeper rise, this last situation being achieved by sliding axially the cam 21 against the action of spring 28 by a lever 29 link-connected to the ratio-adjusting lever 30 of the gearing 27.

If the duration is thus selected that it is the same as the constant time increment required by any one air particle to travel from the inlet to the outlet of the combustion chamber, the latter is just filled, as described, with an explosive air fuel mixture at the instant ignition occurs.

The frequency which is established by the reduction ratio of the gearing 27 is selected on the basis of several considerations that will be discussed later.

Any more detailed description of the fuel injection system (which per se is not part of the invention) is obviated by the fact that both the duration and the frequency of the fuel injection periods, as well as all other fuel injection characteristics, such as the fuel pressure, injector spray pattern, etc., lie well within those found in commercially available injection equipment which has been fully developed for service with reciprocating internal combustion engines. This also applies to the ignition system, which therefore needs no further description beyond that already given and the statements made regarding the proper spark timing, a timing which can be achieved in a variety of ways; for example, by triggering the spark from the fuel pump cam shaft.

Before going further into the details of the periodically occurring explosions and their various effects, one of the most important aspects of the invention may be clarified, by explaining how the abrupt pressure rise associated with these explosions is trapped in such a manner that no reverse flow through the impeller can occur.

The explosion peak pressure is approximately five times the normal combustor charging pressure and no conventional impeller could possibly confine this high pressure. However, if the impeller blading is designed in accordance with the present invention, backfiring during the explosion through the impeller blade passages into the inlet is prevented and the impeller acts very much like a non-return valve that permits flow in only one direction. This valve action is achieved by the novel configuration of the impeller blading, which is illustrated in FIGURES 5 and 6, and the developed projection on a coaxial cylinder shown in the left-hand portion of FIGURE 4. It will be noted from these figures that the impeller blade discharge angle $\beta_2$ is extraordinarily small, approximately 10°–25°, or in the average 15° (as compared with the usual 90° of conventional high speed centrifugal impellers). The inlet angle $\beta_1$ on the other hand, being determined by the usual considerations of shockless entrance of the air, is generally substantially larger: namely, of the order of 30°.

The circumferential blade speed $u_2$ at the discharge is high, approximately 1,350 ft. per second, which corresponds to a Mach number of 1.1 to 1.2 (referred to the inlet temperature). The blade speed at the inlet $u_1$ is as low as permissible by considerations of crowding the required annulus area as closely as possible to the center of rotation.

It is imperative, for reasons of adequate mechanical strength, that the blades of high speed impellers consist of substantially purely radial elements throughout. Such complete radiality of the blades, and at the same time the above extremely small discharge angles, cannot be achieved in any other way than by providing for S-shaped meridional flow paths through the impeller, or in other words, by the use of an axial inlet and an axial discharge for the impeller as was described in connection with FIGURE 3.

Another important feature of the valve action impeller blades is the way the orthogonal passage area between adjacent blades changes from inlet to outlet. This flow area must continuously decrease toward and reach a minimum at the outlet.

A way of readily visualizing the aforedescribed blades and, as a matter of fact, a way of actually producing them, consists of considering them as a special form of screw thread (as many threads as there are blades) and the blade passages as the thread grooves (see FIGURE 6). If these multiple threads are given a constant pitch, the tangent of their helix angle changes inversely proportional to the diameter; for example, from 15° at the large discharge diameter to 30° at the small inlet diameter. The passage area is directly proportional to the radial depth of the thread grooves, which is made to be a minimum at the maximum diameter. Since these screw thread passages wind around the impeller over a considerable angular distance, it can readily be seen that there results a viscous (Archimedes screw pump) pumping action which augments the centrifugal blower action due to the radius increase from inlet to outlet.

It is well known that the smaller the impeller blade discharge angle (the more backwardly discharging the impeller) the higher and flatter is the curve of compressor efficiency vs. flow rate, and the wider the stable range of compressor operation. These advantages, however, are achieved at the expense of such a great reduction of pressure generating ability that much smaller discharge angles than 60° are not ordinarily used, not even in low speed, low pressure ratio compressors or blowers. This is understandable, of course, because the mission of any ordinary centrifugal compressor is to compress air as effectively as possible. In the case of the centrifugal impeller feeding the constant volume combustor of the invention, an entirely new situation is encountered. This impeller does not have to produce a high pressure rise, since a high cycle peak pressure is accomplished by the constant volume combustion, so that it can deliver the air at a very low pressure so long as it is able to contain the explosion pressures.

The valve action impeller, by virtue of it being backwardly discharging at the very small angle, and being otherwise designed as described has a constant r.p.m. characteristic curve of mass flow rate in percent vs. the ratio of total discharge pressure to inlet pressure as shown by curve A of FIGURE 7. This curve is steadily and steeply rising from a very low value of the pressure ratio at 100% flow to a high pressure ratio at a very small flow rate, denoting perfect stability over an extremely wide range of flows. Since the impeller is discharging directly into the combustor, and there are no intervening diffuser vanes, the entire diffusion of the kinetic energy of the air leaving the impeller is accomplished by the vaneless diffuser action of the combustion chamber. Only by dispensing with a vaned type of diffuser and by transforming into pressure and otherwise utilizing the kinetic energy available at the impeller discharge in the combination combustion chamber and vaneless diffuser, does it become possible to achieve the aforementioned extraordinary wide operating range. Diffuser vanes, specifically their angles and areas, could be designed to suit only one particular flow rate, and therefore they would make operation at smaller or larger flows very inefficient.

Inasmuch as the impeller discharges directly into the combustion chamber, it is not the total, but rather the static pressure at the impeller outlet that counts. This static pressure should not be lower than the maximum explosion pressure if backfiring through the impeller passages is to be avoided. The static discharge pressures for steady flows which are given by curve B, however, are far too low to contain the explosions. For this purpose, much higher pressures, such as shown by the vertically hatched area C are needed. As is obvious to those skilled in the art, steady flow static discharge pressures of the magnitude shown by the range C are far beyond the capability of even the highest tip sped centrifugal impeller that can be constructed, but yet, the valve action impeller of the present invention can hold against this high pressure—only for a short instant, to be sure, but long enough to contain the rapidly rising and falling explosion pressures. How this is brought about will now be explained by reference to the velocity vector diagrams of FIGURE 4. These vector diagrams show the relative velocity $w$, the absolute velocity $c$, and the constant peripheral velocity $u$ for 100% flow in full lines (subscript 1, inlet; subscript 2, discharge) and in dash lines, the corresponding velocity components $w'$, $c'$ and $u'$ for approximately 20% flow. The flow areas of the passages between the impeller blades are suitably dimensioned and are gradually decreasing from inlet to outlet to a minimum, or flow controlling area at the vicinity of the blade outlets so that the relative velocity $w$ at this point becomes very nearly sonic (Mach almost 1.0) for the 100% flow rate, for which the absolute velocity $c_2$ is very small. If the flow rate is reduced to 20%, $w_2$ is decreased to an even greater extent because of density effect, whereas $c_2$ is increased and its direction greatly changed fron an angle $\alpha_2$ of the absolute discharge velocity to the angle $\alpha_2'$. No such great changes in the velocity and the direction of the flow occur at the inlet, where it will be noted from the vector diagrams that the relative inlet velocity decreases only slightly from $w_1$ to $w_1'$ and that the angle of the relative flow entering the blades decreases from $\beta_1$ to $\beta_1'$.

The above extraordinarily large changes of both the relative and absolute discharge velocities which result from a change of flow rate, lead to a phenomenon that has not been previously discovered nor made use of, and that has the following decisive bearing on the invention.

If the static pressure at the impeller outlet (which is also the static pressure in the combustor) is increased, the flow delivery decreases in accordance with curve B of FIGURE 5 until the static pressure corresponds to a head (measured in feet of air column) of $$\frac{u_2^2 - u_1^2}{2g}$$

where $u_1$ and $u_2$ are the peripheral blade speeds at the impeller inlet and outlet, and $g$ is the acceleration of gravity. If this back pressure, called the shut-off pressure, is applied, flow through the impeller stops and if this back pressure is exceeded, reverse flow from outlet to inlet occurs. This is true, however, only for the usual case where the change of back pressure takes place slowly and gradually. If this change occurs suddenly, within a very short time interval, the relative velocity $w_2$ must suddenly be decelerated and the absolute velocity $c_2$ accelerated which brings into play inertia forces and corresponding pressure differences. Momentarily for this short time interval $\Delta t$ the shutoff pressure head $H_0$ becomes $$H_0 = \frac{u_2^2 - u_1^2}{2g} + \int_0^{\Delta T} F\left(G, u_2, \rho, \frac{dw_2}{dt}, \frac{dc^2}{dt}\right) dt$$

where G is the mass of air (in mass pounds) having a mean density of $\rho$ that finds itself momentarily in the impeller passages, particularly in the discharge portions thereof. The first term in the above expression is the steady flow shutoff pressure head, the second (integral) term is the dynamic augment, the magnitude of which depends on the impeller blade configuration and particularly on the blade outlet angle $\beta_2$. If $\beta_2$ is 90° (radially discharging impellers), this second term is zero; for forwardly discharging impellers ($\beta_2 > 90°$) it becomes negative; however, for backwardly discharging impellers ($\beta_2 < 90°$) it is positive and increases rapidly for decreasing $\beta_2$ angles to the extent that for very small angles, such as are used for the valve action impeller of the present invention, the momentary shutoff pressure can become three times the steady flow shutoff pressure, provided, of course, that the time interval Δt is very short. This proviso is fully met by the explosion pressures which, as will be discussed in greater detail further on, prevail for only a short instant. In small units, for example, this instant is of the order of 1/500 second, while G in the above equation is also relatively small. In larger units, the duration of the explosion pressures is longer; however, at the same time the air mass G which is subjected to the inertia effects is larger, so that for any size unit the same valve action is achieved with geometrically similar valve action impellers. It can readily be seen that G can also be increased for the purpose of increasing the valve action effect by increasing the axial extent of the discharge branch of the S-shaped meridional flow path. The function F is a rapidly increasing function for a negative rate of change of $w_2$ and for a positive rate of change of $C_2$.

The magnitude of the valve action of the impeller, in addition to the variables discussed, depends on the impeller tip speed $u_2$ which for all practical applications must be in excess of 1000 ft./sec. For any size unit, the previously described valve action capability of the impeller is represented by the vertically hatched area C in FIGURE 7. This area shows the range of values of the static impeller discharge pressures (including the shutoff pressure) prevailing during the explosion (the exact value depends on the time factor) plotted against delivery rate in percent if just before the explosion the delivery rate is 100%. Before describing further the interaction of the explosion pressure waves and the valve action impeller characteristics, the following several aerothermodynamic aspects of the turbine should be clarified.

The flow handling characteristics of any turbine operating at constant r.p.m. are very closely the same as those of an orifice (the so-called equivalent orifice) that discharges the same mass flow rate as the turbine if the initial gas pressure and temperature, and the terminal pressure are the same. For any given initial temperature the flow handling characteristics of such an orifice or turbine can best be represented by a curve of pressure ratio across the turbine vs. mass flow rate, such as curve D in FIGURE 7. This curve applies to the minimum pre-turbine temperature that prevails under conditions of "cold" operation: that is when no heating due to fuel combustion occurs. The similar curve E applies to the maximum pre-turbine temperature. Both of these curves pertain to the turbine driving the valve action impeller, the pressure ratio-flow characteristics of which are shown by curves A, B and range C. It will be noted that during "cold" operation the turbine flow characteristic curve D intersects the steady flow characteristic curve of the impeller at point P, where the flow rate is 100% for both impeller and where the pressure ratio is very low. If, due to the explosive firing, the pressure and temperature in the combustor are momentarily increased, the rate of outflow is given by curve E, and that of the momentary rate of inflow lies in area C. It can be seen that during the height of the explosion, when the pressure in the combination combustion chamber and diffuser is about five times the pressure at 100% flow, flow into the combustion chamber stops and outflow of gases therefrom through the turbine is increased to more than double the 100% air delivery rate. When the explosion pressure then subsides, which goes hand-in-hand with an adiabatic decrease of pre-turbine temperature, outflow from the combustion chamber diminishes, while as soon as the pressure is low enough, air inflow begins again until the equilibrium point P, where the inflow is equal to the outflow, is reached once more.

The large changes of pre-turbine pressures and temperatures that are brought about by the explosions result not only in the above large changes of flow rates through the turbine, but also in large changes of the flow velocities therethrough. Indeed, the range of these velocity changes is so great, that the efficiency of a conventional turbine is seriously reduced over a large part of this range, and the thermodynamic advantages of the explosion cycle are thereby jeopardized. For this and other reasons which will be pointed out, it is highly advantageous to use, in connection with the explosion cycle, the improved wide range turbine designed in accordance with my co-pending patent application, Serial No. 825,773, filed July 8, 1959.

This patent application discloses a novel centripetal turbine that in characterized by an unusually small number of blades, the profiles of which are very thick, have bulbous blade entering (leading) edges, and provide for controlled acceleration of the flow within the blade passages. The right hand portion of FIGURE 4 illustrates these blades by a fragmentary developed section taken on the mean stream surface of the turbine S—S in FIGURE 3. Referring to this developed sectional view, nozzle guide vanes 11, which have also thick, heavy profiles, define the nozzle passages that direct the flow tangentially into the radially inward extending vaneless accelerating passage 12, from which the flow enters into the passages of the aforedescribed centripetal turbine blades 13. At the entrance (subscript 1) and the discharge (subscript 2) of these turbine blades velocity vector diagrams are shown. The inlet and exit triangles drawn in dash lines show the absolute velocity C, the relative velocity W and the constant circumferential blade speed U for the maximum flow temperature and pressure ratio, whereas the triangles shown in full lines give the same velocity components (C', W', U') as they apply to "cold" operation of the turbine when the normal 100% mass flow delivered by the valve action impeller at a low pressure ratio passes through the turbine at minimum temperature.

As far as the turbine efficiency is concerned, one of the most significant changes between the above two operating regimes is the very large difference between $\beta_1$ and $\beta_2'$ the directions of the flow at the entrance to the turbine blades relative thereto. The use of conventional turbine blades would result in an increasingly serious deterioration of the turbine efficiency the greater the deviation of the angle of the relative flow from their sharply defined blade angle. As is explained in detail in said copending patent application, there is no such drastic falling off of the turbine efficiency with the improved blades, because their profiles embody a bulbous entrance and provide for a high rate of flow acceleration in the vicinity thereof.

While the use of the improved turbine in conjunction with the explosion cycle covered by the present invention is most desirable from the point of view of its wide range of highly efficient operation, its use is almost mandatory to cope with the extremely high peak temperatures and the rapid temperature fluctuations. Instead of the great number of thin, fragile, narrow blades of a conventional turbine, the new turbine has only a few, wide, heavy and extremely rugged blades that have less total "wetted" surface, which minimizes their heat absorption from the gases. The improved blade profiles are very thick and devoid of the usual thin and slender inlet and outlet portions that can easily overheat locally and burn off. All of this results in the blades having a large inertia effect with respect to the heating by the successive hot blasts of the explosions. Since each such blast is followed by a much longer lasting flow of cool air, this high heat inertia effect that characterizes the improved turbine blades causes the blade metal temperature to remain within safe limits despite the fact that the momentary maximum temperature of the gases may exceed the melting temperature of the blade material.

In addition to the losses in the rotating blade channels, another source of large losses that would occur in a conventional turbine is due to the supersonic velocity or the high Mach number of the absolute velocity $c_1$ approaching the blades during the explosion period, when the expansion pressure ratio is higher than the critical pressure ratio. During this period, when incidentally the turbine output reaches its maximum, the nozzles should be of the supersonic or converging-diverging type, so as to even achieve supersonic flow velocity and to avoid large losses. During the subsequent period of operation, however, when the pressure ratio is sub-critical such converging-diverging nozzles would operate very inefficiently. What is therefore needed to achieve good turbine efficiency under all conditions of the turbine operation is a rapidly changing nozzle configuration, one which instantaneously adapts itself to the momentary pressure ratio and changes from converging-highly diverging to less and less diverging, and finally to a purely converging nozzle passage. This is obviously mechanically impossible to achieve, and has long been a serious stumbling block in the development of the explosion gas turbine. Now, however, the exact equivalent of the automatic self-adjustment of the nozzle configuration is accomplished by the present invention. As the result of positioning the converging nozzles outside and around a radially inward extending vaneless accelerating passage, as described above. In this passage the velocity becomes supersonic in accordance with the free vortex law, whenever the expansion pressure ratio exceeds the critical ratio and the exact equivalent of a properly diverging nozzle passage portion that must be provided to make supersonic velocity possible is achieved by the flow's automatically changing the helix angle of the inwardly spiralling flow. This vaneless accelerating passage has also another function which will be discussed in connection with the following explanation of the timewise sequence of the various events and flow phenomenon.

FIGURE 8 shows the cyclic variation with time of the pressure (full line curve) in the combustion chamber. During each cycle, the duration of which may be 1/100 second in a small unit, the pressure in the combustion chamber increases almost instantaneously as the result of the explosive combustion, then decreases rapidly to a low minimum value of the pressure ratio, which is followed by a slow increase to the original (charge) pressure ratio, at which point the rates of inflow of air from the valve action impeller and the outflow to the turbine are both 100% as shown by the flow rate curves. From the inflow curve, it will be noted that when the peak of the explosion pressure rise occurs, air inflow virtually stops. However, as soon as the combustion chamber pressure drops, the rate of air delivery rapidly increases to momentarily more than the normal 100% flow rate. This delivery excess is the amount of air which was stopped from discharging by the high combustion chamber pressure an instant before and was consequently dammed up, densified by ram effect, stored in the valve action impeller passages and finally dumped into the combustion chamber.

The total time increment for an explosion pressure wave to build up and subside is aproximately ¼ of a cycle, leaving ¾ thereof for scavenging and charging the combustion chamber and cooling all stationary and rotating passage walls that are exposed to the high gas temperatures. There is, thus, not only more time available for cooling than is devoted to heating, but the cooling air mass flow is also larger than the air mass flow participating in the combustion, which results in very effective cooling and is the key to the operation with the very high gas peak temperatures that result from the combustion under conditions of low air fuel ratios.

To bring about these desirable conditions, it is essential that the explosion pressure waves subside rapidly, and that a wave system as described, be achieved, whereby each pressure wave is followed by a rarification wave. This is insured by the inertia effects to which the column of flowing gases proceeding through the turbine are subjected. This dynamic phenomenon occurs chiefly in the vaneless accelerating passage 12 of FIGURE 3, and to a lesser extent, in the decelerating passage (turbine exhaust diffuser) 14 because of the large mass of gases that at any one instant finds itself in these passages being subjected to large and rapid changes of velocity. Passage 12 contributes, therefore, to the attainment of a very high frequencies (as high as 100 cycles per second) of the complete gas changes process described, which results in high specific outputs, or in other words, in a compact and light unit for a given B.H.P. rating.

During the fraction of each cycle when the temperature, the pressure ratio and the flow rate of the gases passing through the turbine are high, virtually the entire turbine output is developed, as is shown by the curve of B.H.P. vs. time presented in FIGURE 9. This figure also shows a curve giving the B.H.P. required for driving the valve action impeller, from which it will be noted that this power varies little from beginning to end of each cycle, and is quite small. However, it can be seen that the power developed by the turbine during the cooling and charging phase of each cycle is even smaller, so that during this phase the net output of the unit is slightly negative, as shown by the vertically hatched area in FIGURE 9. This negative power, or in other words, the power input required during the second half of each cycle for scavenging and charging the combustion chamber and cooling the entire turbine, must of course be subtracted from the net turbine output developed during the first half of each cycle, shown in FIGURE 9 by the horizontally hatched area, to arrive at the net useful output of the unit.

It should be mentioned at this point that the flywheel effect of the heavy, high-speed rotor and the high frequency with which the power surges shown by FIGURE 7 occur, prevent perceptible changes of the rotor speed.

The frequency of the explosion waves (each of which is immedately followed by a rarification wave) depends exclusively on the frequency of the fuel injections. This distinguishes the invention from other developments, in which the wave system is created by a resonance effect similar to that occurring in an organ pipe, involving in some cases periodic, mechanically produced interruptions of the flow, such as caused by the vibrating reed of certain sound instruments. In these developments, the system has its own natural frequency and the heating by fuel combustion must be timed accordingly, whereas in the present invention the frequency of the fuel injections, being the sole cause of the wave system, can be freely chosen. This freedom can be used to great advantage, as follows:

At full load of a given unit, the frequency of the fuel injections is so selected that during the cooling phase of each cycle just enough cold air is interposed between the successive hot blasts that adequate cooling is achieved, all as described above. At part load, however, the frequency is reduced, that is, the length of each complete cycle is increased. This method of reducing the B.H.P. output at constant r.p.m. results in over-cooling during part load operation, but it has the very desirable effect that the combustion of the fuel invariably occurs under conditions of a constant low air-fuel ratio, maximum temperature and maximum explosive pressure rise, which results in a minimum possible part load fuel consumption or in a very flat curve of specific fuel consumption vs. load. The necessary reduction in the frequency of the fuel injections with the reduction of load, can be achieved as already described.

An alternative method of load control, which does not require a change of the cycle frequency and the afore-described variable speed drive of the fuel pump, but nevertheless results in maintaining the air-fuel ratio constant as required for explosive combustion and as is most desirable from the point of view of achieving good partload fuel economy owing to the maintenance of high cycle peak temperatures, will now be described. In the radially inward extending branch of the impeller approach passage there may be provided adjustable inlet guide vanes for the purpose of changing the impeller pre-whirl, as described in detail in my co-pending patent application Serial Number 825,773, filed July 8, 1959, to bring about a change of flow rate. This air flow control is synchronized with the conventional control of the fuel injection (regulating the amount of fuel injected) in such a manner that the air fuel ratio remains substantially constant over the entire range of loads.

It is obvious that for certain specific purposes both of the above control methods can be combined. The new explosion gas turbine illustrated by FIGURE 3 and described in the foregoing embodies only a single impeller, the chief function of which is to act as a non-return valve by preventing reverse flow of the air during the explosions. This valve action being a dynamic phenomena requires a high impeller circumferential velocity on the one hand, and on the other hand, it makes it necessary that during the normal full air delivery of the impeller, the pressure rise therethrough be quite low. For this reason, a single stage unit in accordance with FIGURE 3 would normally be designed to have not much more than atmospheric pressure in the combustor, at the moment when ignition occurs, or in other words, the cycle compression ratio would be very low. As shown by the table above presented the thermal efficiency is greatly improved if this compression ratio is increased. Higher compression ratios could be achieved by increasing the peripheral speed of the impeller; but this would lead to supersonic flow velocities and, consequently, a considerable increase of the losses, and it is therefore more desirable to resort to a multi-stage compressor arrangement in which low Mach numbers prevail.

From the temperature-entropy and pressure-volume diagrams shown in FIGURES 1 and 2, it is clear that the output derived from any constant volume combustion cycle that employs compression of the air to a pressure $P_{c_2}$ is the sum of the output of a constant pressure combustion cycle for which this constant pressure is $P_{c_2}$ and a constant volume combustion cycle for which the compression ratio is 1.0. We can therefore retain the basic arrangement of FIGURE 3 for operation at any desired pressure level (rather than atmospheric pressure at the valve action impeller inlet and the turbine outlet as heretofore discussed). This involves adding one or several compressor stages that precompress the air before it is admitted to the valve action impeller and adding one or several turbine stages, in which the combustion gases are expanded from whatever higher pressure is selected to atmospheric pressure. If these added stages are connected to the inlet and discharge of the basic unit via plenum chambers of sufficient capacity, for example, through long conduits, these stages operate under conditions of steady flow despite the intermittent operation of the basic unit which functions exactly as described, except that it does so on a higher pressure level. Almost perfectly steady operation of the added compressor as brought about by interposing a suitable plenum chamber is only necessary if this compressor has a narrow range of flows over which its efficiency is high, as is the case, for example, with an axial flow compressor. If a compressor is used that has a flat curve of efficiency vs. flow rate, and at the same time a curve of pressure ratio vs. flow rate that is steeply and continuously rising over a wide range with decreasing flow rates similar to the characteristic curve of the valve action impeller, the plenum chamber can be eliminated or made very small. Such a compressor is then automatically forced to participate in and augment the valve action of the special impeller provided at the inlet of the combustion chamber. This makes it possible to reduce the valve action of this impeller by reducing its peripheral speed, or preferably, by causing it to produce a higher pressure ratio under conditions of 100% flow rate.

Similar considerations apply to the use of a plenum chamber at the outlet of the turbine and directly ahead of the additional turbine stage or stages needed in conjunction with a high pressure ratio unit. If the volume of this plenum chamber is large, the low pressure turbine operates with virtually steady flow, but the high pressure turbine is subjected to the full flow and $u/c$ changes which are occasioned by the explosion pressure waves.

The advantages of a high cycle compression ratio or a multi-stage unit with respect to higher thermal efficiency, improved compressor and turbine performance, steadier delivery of the useful power output, etc., are so great that the preferred embodiment of the invention takes the form of a multi-stage unit.

As follows from the preceding discussion, a multi-stage arrangement can take many different forms without departing from the basic invention. It further follows from what has been stated, that a particularly attractive form of multi-stage unit results from the use of a wide range compressor delivering compressed air to the inlet of the valve action impeller. Such a preferred arrangement is shown in FIGURE 10, which is a longitudinal section through a unit that, as far as its basic design and operation are concerned, is identical with the unit shown by and described in connection with FIGURE 3, except that two compressor stages upstream of the valve action impeller and a turbine stage downstream of the turbine of FIGURE 3, are added.

The first and second stage impellers 31 and 32, together with the valve action impeller 33 (which constitutes the third compressor stage) and the turbine wheel 34 driving the compressor makes up the complete free running rotor that is mounted in bearings 35 and 36. The second stage, low pressure turbine wheel 37 is arranged co-axially with, but mechanically independent from the compressor drive turbine, from which it receives its driving gases through annular connecting passage 38.

The entire net output is developed by the low pressure turbine wheels 37, which is mounted in overhung fashion on the pinion shaft 39 of the (planetary) reduction gear 40 that delivers the output through low speed shaft 41.

The same type of cam actuated reciprocating plunger fuel injection pump 42 previously described, is driven from the outboard end of the free running compressor rotor and delivers the fuel to a number of fuel injectors 43. (The pump is shown in simplified form, omitting the adjustable features, and the arrangement for the regulation of the fuel flow for load control purposes can take one of the two forms discussed in connection with the single stage unit. If for control purposes adjustable inlet guide vanes, as discussed, are used in a multi-stage compressor they would be arranged in the approach passage to the first stage impeller thereof.) Upon completion of the fuel injection period and at the moment when the combustion chamber 44 is filled from air inlet to gas outlet with an explosive air fuel mixture, ignition thereof is produced by spark plugs 45 and constant volume combustion occurs exactly, as previously described. Accordingly, the pressure in the combustion chamber rises instantaneously to approximately five times the charging pressure. The heat and pressure energy contained in this pressure wave is converted into mechanical energy by the two turbines in a manner which will be discussed in detail, but is in general identical with that described in connection with the basic single stage unit.

Reverse flow of the pressure wave from the combustion chamber through the air inlet thereof and through the flow passages of the compressor is prevented, chiefly by the valve action impeller 33 as previously described. With a multi-stage arrangement, this valve action can, however, be augmented to a considerable extent by the earlier compressor stages, provided they are suitably designed. For this purpose, the impeller tip speed of these stages must be high, the blade discharge angles small, and the stage pressure rise modest, all of which follows from the previously given explanation of the valve action, about which it was stated that the short time pressure increase against which the special impeller can momentarily hold without reverse flow occurring becomes higher with higher impeller tip speed, smaller blade discharge angle and lower normal steady flow pressure ratio. In accordance with these principles, the three stages of the compressor shown in FIGURE 10 operate with quite high impeller tip speeds of the order of 1,300 ft. per second, but with a much more modest stage pressure ratio than that of conventional high tip speed impellers, because all three impellers are backwardly discharging at small angles, as is shown by FIGURE 11, which is a fragmentary development of a radial projection of all rotating and stationary compressor blades (and also the turbine blades) on a coaxial cylinder. As shown by this figure, the compressor blade discharge angles can be, for example, 40°, 25° and 15°, for the first, second and third stage impellers respectively, and the blade configuration and spacing are preferably made in accordance with my prior patent application Serial No. 825,773 to achieve the highest possible compressor efficiency and the widest possible stable operating range.

The small $\beta_2$ angles and the modest stage pressure ratios, in addition to being necessary for the purpose stated, result in low subsonic Mach numbers for all the absolute and relative velocity components, (despite the supersonic peripheral blade speeds) and most of the compression being achieved by the highly efficient centrifugal effect to which the air is subjected, so that very little of the total pressure rise must be brought about by the comparatively inefficient conversion (in the diffusers) of kinetic energy into pressure. By reason of the low Mach number and the low energy conversion in the diffuser passages, the diffuser vanes, particularly their inlet angles, are not critical over a wide range of flows and the function of the diffuser vanes 46 can be confined largely to merely turning the air into axial direction (thus removing its spin) and to guiding it smoothly from the axial outlet of one impeller into the axial inlet of the next one. Accordingly, the meridional flow paths of the diffuser passages 46 are S-shaped and suit the similar S-shaped meridional flow paths through the impeller passages 48. As in the case of the single stage unit, this type of impeller configuration is necessary to achieve a purely radial, and therefore bending free configuration of the impeller blades that have the above very small outlet angles.

If it were not for the compressibility of the air and the plenum chamber effect of the first and second stage diffusers and that of the interconnecting passages, these stages would have to operate over the same wide range of flow rates during each exposion cycle as the third stage, or valve action, impeller must operate. Since, however, the first and second stages are primarily compressor stages, their valve action must be limited and if high compressor efficiency is to be achieved, they must not be allowed to operate during any one cycle over an excessive range of flow rates. This can easily be accomplished by providing a large enough volume of the interconnecting passages, or if necessary, by adding one or more separate plenum chambers, such as 49 in FIGURE 10. This annular, torus shaped plenum chamber is so arranged and connected to the low velocity outlet region of the second stage diffuser 47, that air can enter and discharge tangentially and be stored therein when, during the occurrence of each explosion pressure wave, the flow into the third stage impeller stops for just an instant as the result of its valve action. The participation by the aforedescribed first and second stages in this valve action can be controlled, therefore, by the volume of the plenum chamber in such a manner that the cyclic variations of flow rates through these stages is within the limits within which the compressor stage efficiencies remain substantially at their maxima.

A plenum chamber similar to the one just described could also be used between the two turbines to increase the receiver effect of the interstage passage 38, so as to smooth out the pressure waves and equalize the temperature variations. This would cause the low pressure turbine to operate with almost steady flow and constant $u/c$, and therefore with maximum efficiency; however, it would throw the burden of handling the wide range of cyclic changes of expansion ratio, temperature and flow rates entirely on the high pressure turbine, the $u/c$ of which would change from 0.32 to 1.5, for example, such extreme $u/c$ changes would not permit the high pressure turbine to operate with an efficiency that remains uniformly high throughout the entire extent of each cycle, not even if a wide range turbine, in accordance with my prior patent application and shown by FIGURES 10 and 11, is used. Such a turbine can, however, be designed to have an almost constant efficiency over a smaller range of $u/c$, for example from 0.42 to 0.9, which is the reduced range that results from permitting the low pressure turbine to participate in the handling of the flow pulsations by providing a small volume of the interstage passage 38.

The higher thermal efficiency of a multi-stage explosion gas turbine as shown by FIGURE 10, as compared with that of the basic single stage arrangement illustrated by FIGURE 3, is therefore not only due to the higher compression ratio, but is also due to the better turbine performance. Other advantages of the multi-stage arrangement are the steadier delivery of power by the separate power turbine, and the fact that this turbine can handle whatever r.p.m. changes may be imposed by the load, while the speed of the free-running turbine and compressor remains constant, as is desirable for the optimum valve action of the compressor stages.

While specific forms of the invention has been illustrated and described, it will be recognized that deviations may be made from the stated requirements for optimum operation while still providing acceptable characteristics. Sacrifice of efficiency may be dictated, for example, by considerations of cost, available space, weight, or the like. Accordingly it is to be understood that the invention is not to be construed as limited, except as required by the following claims.

What is claimed is:

1. An explosion gas turbine power unit comprising a centrifugal impeller, a combustion chamber receiving air directly from said impeller, nozzles receiving combustion gases from said combustion chamber, a gas turbine having passages defined by blades receiving, and driven by, gases from said nozzles, means connecting said gas turbine to said centrifugal impeller to drive the latter, said impeller having blade discharge angles directing the relative flow of air therethrough backwardly with respect to its rotation at an angle between 10° and 25° and having its minimum passage area between adjacent blades in the vicinity of the discharge ends of its passages, means for intermittently injecting finely atomized fuel into the inlet portion of said combustion chamber, with each injection prolonged through a period corresponding approximately to the time required for the flow of air to travel through the combustion chamber from the impeller to said nozzles so that said combustion chamber is substantially filled with explosive mixture during each injection period, and means for igniting the explosive mixture at approximately the end of each injection period.

2. A unit according to claim 1 in which the combustion chamber is in the form of an annular diffuser receiving air from the impeller at substantially its minimum radius and discharging gases to the nozzles at substantially its maximum radius.

3. A unit according to claim 1 in which the means for injecting fuel is timed to provide fuel injection during less than half the repetition period of successive injections, thereby to provide substantial periods for flow of cooling air.

4. A unit according to claim 1 in which said impeller provides a meridional flow path which is S-shaped and has at least its discharge portion extending axially.

5. A unit according to claim 1 provided with an exhaust diffuser receiving gases from said turbine.

6. A unit according to claim 1 provided with a vaneless exhaust diffuser receiving gases from said turbine.

7. A unit according to claim 1 provided with a vaneless annular chamber having substantial radial extent and receiving at its outer periphery discharge from said nozzles and having its inner portion communicating directly with the entrances to the turbine passages to provide vortex flow at such entrances.

8. A unit according to claim 7 in which the turbine is of centripetal type.

9. A unit according to claim 1 having at least one compressor stage preceding said impeller.

10. A unit according to claim 9 having at least one turbine stage following said turbine.

11. A unit according to claim 10 in which said following turbine stage rotates independently of the first mentioned turbine.

12. A unit according to claim 1 having at least one turbine stage following said turbine.

13. A unit according to claim 12 in which said following turbine stage rotates independently of the first mentioned turbine.

14. A unit according to claim 1 having at least one compressor stage immediately preceding said impeller, said compressor stage comprising a centrifugal impeller having a meridional flow path of S-shape with blades directing the relative flow backwardly with respect to its rotation at a small angle so that the compressor characteristic curve of pressure rise versus flow steadily rises over a wide range of decreasing flow.

15. A unit according to claim 1 including means for varying the frequency of the fuel injection periods without changing the duration thereof.

16. A unit according to claim 1 including means for varying the whirl of air entering said impeller.

17. A unit according to claim 1 in which said impeller has a pressure ratio v. flow characteristic curve which is steeply rising with decreasing flow.

18. A unit according to claim 1 including a plurality of impeller stages of which said impeller constitutes the last stage, and means for varying the whirl of air entering the first stage impeller.

No references cited.